US010625776B2

(12) United States Patent
Rebhan et al.

(10) Patent No.: US 10,625,776 B2
(45) Date of Patent: Apr. 21, 2020

(54) DRIVING ASSISTANCE TECHNIQUE FOR ACTIVE VEHICLE CONTROL

(71) Applicant: HONDA RESEARCH INSTITUTE EUROPE GMBH, Offenbach/Main (DE)

(72) Inventors: Sven Rebhan, Offenbach (DE); Jens Schmüdderich, Offenbach (DE); Marcus Kleinehagenbrock, Offenbach (DE); Robert Kastner, Offenbach (DE); Naoki Mori, Tochigi (JP); Shunsuke Kusuhara, Tochigi (JP); Hiroyuki Kamiya, Tochigi (JP)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 723 days.

(21) Appl. No.: 14/478,423

(22) Filed: Sep. 5, 2014

(65) Prior Publication Data
US 2015/0073662 A1 Mar. 12, 2015

(30) Foreign Application Priority Data
Sep. 9, 2013 (EP) .................................... 13183492

(51) Int. Cl.
*B60W 50/00* (2006.01)
*B60W 30/14* (2006.01)
(Continued)

(52) U.S. Cl.
CPC ............. *B62D 6/00* (2013.01); *B60W 10/184* (2013.01); *B60W 10/20* (2013.01);
(Continued)

(58) Field of Classification Search
None
See application file for complete search history.

(56) References Cited

U.S. PATENT DOCUMENTS 6,805,216 B2 * 10/2004 Noecker ............ B60K 31/0008
180/170
8,457,827 B1 * 6/2013 Ferguson ................ G05D 1/00
180/169
(Continued)

FOREIGN PATENT DOCUMENTS

DE 10059030 A1 * 6/2001 .......... B60T 8/17551
EP 2 172 919 A1 4/2010
(Continued)

OTHER PUBLICATIONS

European Search Report dated Feb. 11, 2014 corresponding to European Patent Application No. 13183492.1.

*Primary Examiner* — Christian Chace
*Assistant Examiner* — Kyung J Kim
(74) *Attorney, Agent, or Firm* — Squire Patton Boggs (US) LLP (57) ABSTRACT

The invention relates to a driving assistant adapted for active control of a vehicle based on predictions of a behavior of a detected object. A method aspect of the invention comprises accepting a first prediction of a behavior associated with the detected object from a first prediction subsystem and a second prediction from a second prediction subsystem; determining a control signal based on a combination of the first prediction and the second prediction; and initiating active control of the vehicle based on the control signal.

11 Claims, 7 Drawing Sheets

(51) Int. Cl.
*B62D 6/00* (2006.01)
*B60W 30/095* (2012.01)
*B60W 40/04* (2006.01)
*B60W 30/16* (2020.01)
*B60W 30/12* (2020.01)
*B60W 30/18* (2012.01)
*B60W 10/184* (2012.01)
*B60W 10/20* (2006.01)

(52) U.S. Cl.
CPC ........ *B60W 30/0956* (2013.01); *B60W 30/12* (2013.01); *B60W 30/16* (2013.01); *B60W 30/18163* (2013.01); *B60W 40/04* (2013.01); *B60W 2710/207* (2013.01); *B60W 2720/10* (2013.01); *B60W 2720/106* (2013.01)

(56) References Cited

U.S. PATENT DOCUMENTS

| | | |
|---|---|---|
| 2008/0065328 A1 | 3/2008 | Eidehall et al. |
| 2010/0228419 A1 | 9/2010 | Lee et al. |
| 2013/0261872 A1* | 10/2013 | Ferguson ................ G05D 1/00 701/28 |

FOREIGN PATENT DOCUMENTS

| | | |
|---|---|---|
| EP | 2 289 754 A1 | 3/2011 |
| EP | 2 562 060 A1 | 2/2013 |
| WO | WO 2010/089661 A2 | 8/2010 |

* cited by examiner

DRIVING ASSISTANCE TECHNIQUE FOR ACTIVE VEHICLE CONTROL

TECHNICAL FIELD

The present invention relates to a technique for assisting a driver by way of active control of a vehicle. More specifically, the invention relates to a driving assistance system and method for actively controlling a vehicle based on predictions of a behavior of a detected object.

BACKGROUND

A manifold of driving assistance systems for vehicles is available today which aim at increasing driving comfort and/or safety of the passengers of a vehicle. Based on various sensor equipment such as radar, lidar, cameras, etc., functions related to driving or maneuvering range from distance sensing and parking assistance to sophisticated "Advanced Driver Assistant Systems" (ADAS) such as, for example, cruise-control functions, e.g. "Intelligent Adaptive Cruise Control" (IACC), which may include a lane change assistant, collision mitigation functions, emergency braking, etc.

Functions related to, e.g., ADAS may include a detection of other vehicles or objects moving in front or behind the ego-vehicle, and may include functions for predicting a future behavior of moving objects, e.g. with respect to a potential lane change of a vehicle detected ahead of the ego-vehicle. It is generally demanded for assistance functions relying on predictions to operate with high reliability, which includes avoiding situations that may let the driver feel uncomfortable or that may even require intervention of the driver.

US 2010/0228419 A1 describes a technique for risk assessment in an autonomic vehicle control system. Each of a plurality of objects detected proximate to a vehicle is monitored by various sensor equipment such as long- and short-range radar and a front camera. Sensor data are fused and, based on the fused data, object locations are predicted relative to a projected trajectory of the ego-vehicle. A collision risk level between the vehicle and each of the objects during a lane-change maneuver is assessed with respect to potential actions of the detected objects such as continuing with a fixed velocity, mild braking, or hard braking. A lane change maneuver is controlled according to the assessment and risk tolerance rules specifying spatial safety margins.

EP 2 562 060 A1 (EP'060 for short hereinafter) describes a technique in a host vehicle for predicting a movement behavior of a target traffic object with exemplary emphasis on target objects cutting-in to a lane of the host vehicle or cutting-out from the lane of the host vehicle. The technique is based on two separate prediction subsystems, wherein a context based prediction (CBP) is related to a recognition of a movement behavior, i.e. a determination of "what" will happen, while a physical prediction (PP) is related to a determination of "how" a behavior will or may happen. The context based prediction relies on at least indirect indicators, while the physical prediction relies on direct indicators.

Direct indicators comprise observable variables, which are observable if and only if the behavior to be detected has started. For example, for predicting a lane-change, a set of direct indicators may comprise one or more of a lateral velocity, a lateral position relative to the lane, a changing orientation relative to the lane, and a changing orientation relative to other traffic participants.

Indirect indicators comprise observable variables, which are already observable before the predicted behavior has started. Indirect indicators may be defined as a set of indicators excluding direct indicators. For example, indirect indicators may relate to information about a relation between at least one traffic participant and one or more other traffic participants or static scene elements, such as an indicator indicating whether or not a fitting gap is available on a lane neighboring to the host-vehicle.

Other indirect indicators may relate to information about driver intentions, which may actively be communicated by the traffic participant whose behavior is to be predicted. Examples are intentions presumably indicated with a turning-signal, a braking-light, or information received via car-to-car-communication.

A set of potential trajectories is computed for a target vehicle. By using the predicted movement behaviors from CBP, the set of relevant trajectories may be reduced. Matching a situation model against the history of perceived positional data in PP may help to further reduce the relevant trajectories.

More specifically, for predicting a target vehicle's future positions, in a first step, the probability for the target vehicle to perform one of a set of possible movement behaviors is estimated by the CBP. Some or all of these movement behaviors are validated by means of a PP. The purpose of the physical prediction is twofold: First, it validates the set of possible trajectories against a combination of the results of the CBP, the physical evidence, and vehicle relations. Second, it estimates the future position of each vehicle. In a final step a mismatch detection analyzes the consistency of the PP and the CBP. In case of mismatch, a fallback to the PP can be performed.

The context based prediction, physical prediction, and mismatch detection can be encapsulated in situation specific models and may be performed by different hardware units within the driver assistance system. Suited models fitting to the vehicle's environment can be activated or deactivated based on environment perception or self-localization.

While predictions serve generally well as a basis for decisions in advanced driver assistance systems, there remain problems. Generally, sensor data are prone to errors such as misdetection, late detections, and/or wrong detections, which in turn may lead to less reliable predictions. Providing additional and further sensor equipment may serve to improve the available data basis, but at increasing costs and hardware complexity. Therefore there remains a general need for improving the reliability of such systems at limited costs.

Problems may also result from wrong predictions which result from limited or wrong sensor data. Active control performed based on a wrong prediction may need to be stopped and reversed when the target vehicle shows an unpredicted behavior or a behavior which has been predicted with an inappropriately low probability. The resultant control may seem inappropriate, confusing and not comfortable to the driver and/or other traffic participants. The assistance system described in EP'060 intends to minimize wrong predictions as far as possible by means of the introduction of situation models and a mismatch detection, amongst others.

SUMMARY

There remains a need for a cost-efficient driving assistance technique which is improved in its response to a detected environment.

The above need is satisfied by a method in a driver assistance system for actively controlling a vehicle, which comprises the steps of accepting a first prediction of a behavior associated with a detected object from a first prediction subsystem; accepting a second prediction of a behavior associated with the detected object from a second prediction subsystem; determining a control signal based on a combination of the first prediction and the second prediction; and initiating active control of the vehicle based on the control signal.

The vehicle (host-vehicle, ego-vehicle) may be a car, truck, or bus, or in general any object intended for driving on a road, motorway, etc., which may include manned vehicles driven by a driver but also automatically driven vehicles such as robot vehicles. In this respect, the term 'driver assistance system' is to be understood herein as including in general any kind of driving assistance system which may be employed in unmanned vehicles as well.

Similarly, the detected objects may include any kind of moving objects such as other vehicles, cars, trucks, busses, motor/cyclists, robotic vehicles, but also trolleys, pedestrians, and even animals such as horses. The objects may be detected by any kind of sensor equipment or circuitry hosted by the ego-vehicle. The object under consideration for a specific prediction may be referred to herein as 'target object'.

The first and second prediction subsystems are different from each other, i.e. are not identical to each other, which is to be understood such that a different prediction technique, approach, scheme, and/or procedure may be applied, including that there is at least one difference in the processing, the steps to be performed, etc. The first and second prediction subsystems may be different from each other in the sense that each subsystem operates to provide a prediction of a behavior of a detected object independent of the prediction provided by the other subsystem. According to other embodiments, one of the prediction subsystems receives an output of the other subsystem as an input.

The first and second prediction subsystems may operate on the same data set or on a different data set, such that the data sets differ in at least one data item. As an example, the predictions of the subsystems may rely on a different set of sensor data as provided by the sensor equipment. It is noted that the term 'sensor data' is understood herein as also including data received by the driver assistance system via, e.g., direct car-2-car communication or indirect communication via fixed transceiver stations along a road, information provided via wireless or mobile communication, for example from a traffic information system, etc.

The subsystems may rely on one and the same data set, onto which different prediction techniques are applied. According to other embodiments, different data sets with respect to the detected environment of the host-vehicle are used, such that the data sets differ in which of the detected moving or still objects are considered for the predictions.

With regard to the driving assistance system described in EP'060, the separate subsystems may differ in the set of indicators relied upon. In that system, the context based prediction subsystem relies at least on indirect indicators, while the physical prediction subsystem relies only on direct indicators. As a specific example, the set of objects relied upon by the context based prediction subsystem may include the target objects, the ego-vehicle and further moving objects ahead or behind the target object and/or ego-vehicle in order to provide a prediction whether the target object is about to perform a lane-change. In contrast, the physical prediction subsystem only relies on data sensed with respect to the target object to provide a prediction of a lane change.

It is understood that, besides the data sets of the direct and indirect indicators as described in EP'060, other data sets as based on different sensor data and/or different data derived therefrom on a higher processing level can be envisaged. Further, instead of only two sets, such as the sets of the direct and the indirect indicators, three or more different data sets can be contemplated. Additionally or alternatively, instead of only two separate prediction subsystems, three or more separate prediction subsystems can be contemplated and the principles of the invention can be applied to such systems in ways similar to that which are described herein.

The combination of the first and second predictions may comprise any kind of calculation or operation such as at least one of a summation and a multiplication of representations of the predictions, and may comprise complex operations such as a concatenation of simple operations.

As an output of the respective prediction subsystems, the first and second predictions may each comprise a set of potential behaviors with associated probability values. The values may be understood as indicating a probability for a target vehicle to perform the associated potential movement behavior. The determination of the control signal may then be based on a combination of at least one of the probability values of the first prediction and at least one of the probability values of the second prediction. According to some embodiments, at least one of the probability values of the first prediction and the probability values of the second prediction may also be provided as a direct input to the determination of the control signal.

According to embodiments of the method, the control signal indicates one value taken from a range of values associated with a particular operation of the vehicle. In some of these embodiments, the control signal may set a maximum or minimum value of the range of values. According to one embodiment, a predefined limiting value, for example related to a maximum braking or accelerating action available for active control initiated by the driving assistant, e.g. for adaptive cruise control, is modified by the control signal and is set to a higher or lower value. Further or other assistance systems arranged for receiving the control signal may then operate within the limit or limits indicated by the control signal.

In some of these embodiments, including the first and the second prediction in the combination calculation and/or the determination results in an increase or decrease of the control signal value as compared to including only one prediction in that operations. For example, including the first and the second predictions in the calculations may increase or decrease the resulting control signal value as compared to a calculation including only one of the first and second predictions. Considering the combination of the first and second predictions may therefore result in intermediate or lower control signal values as would result conventionally based on only one prediction.

For instance, the combination with the second prediction may act to strengthen or weaken the first prediction, for example with respect to a probability value associated to a particular potential behavior such as an acceleration, deceleration, a lane change, etc. of a target vehicle. Therefore, the calculation of a combination of predictions according to the invention may comprise complex calculations different from or including more than a mere selection of one of the predictions.

The control signal may indicate at least one of the following of the ego-vehicle: An acceleration, a deceleration, a braking action, a steering angle. Additionally or alternatively, the control signal may indicate a control of equipment of the vehicle and may indicate, for example, switching on or off a motor, or a signal or light of the vehicle, such as a turn light, braking light, or a warning signal, and of actuating emergency equipment such as airbags.

According to some embodiments of the method, the first and second prediction subsystems comprise at least one of a context based prediction subsystem for predicting behavior based on indirect indicators observable before a start of a predicted behavior, and a physical prediction subsystem for predicting behavior based on direct indicators observable after a start of a predicted behavior.

Generally, the control signal may be determined based on at least one of an indication of the first prediction subsystem and an indication of the second prediction subsystem. According to some implementations of that embodiment, the control signal may be determined based on at least one of a weight associated with the first prediction subsystem and a weight associated with the second prediction subsystem. For example, the weights can be indicative for a prediction reliability of the subsystems relative to each other. The context based prediction subsystem can have associated therewith a lower weight than the physical prediction subsystem.

According to various embodiments, a driving assistance system may comprise not only two, but three or more separate prediction subsystems. Accordingly, a first, a second, a third, etc. prediction may be accepted and the three or more predictions may be combined as a basis for determining a control signal.

The above-indicated need is further satisfied by a computer program product comprising program code portions for performing the method according to any one of the methods and method aspects outlined above or elsewhere herein, when the computer program product is executed on a computing device, for example one or more electronic processing modules of a vehicle. The computer program product may be stored on a computer readable recording medium, such as a permanent or re-writeable memory within or associated with a computing device or a removable CD-ROM, DVD or USB stick. Additionally or alternatively, the computer program product may be provided for download to a computing device, for example via a data network such as the Internet or a communication line such as a telephone line or wireless link.

The above-indicated need is still further satisfied by a driver assistance system for actively controlling a vehicle, which comprises a component adapted to accept a first prediction of a behavior associated with a detected object from a first prediction subsystem; a component adapted to accept a second prediction of a behavior associated with the detected object from a second prediction subsystem; a component adapted to determine a control signal based on a combination of the first prediction and the second prediction; and a component adapted to initiate active control of the vehicle based on the control signal.

The system and/or any of the functions described herein may be implemented using individual hardware circuitry, using software functioning in conjunction with a programmed microprocessor or a general purpose computer, using an application specific integrated circuit (ASIC) and/or using one or more digital signal processors (DSPs).

According to various embodiments, the driver assistance system comprises a cruise control module adapted to perform an active control of the vehicle in response to a lane-change of a detected object cutting-in to or cutting-out from a lane of the vehicle.

The above-indicated need is further satisfied by a vehicle comprising a system such as outlined above and/or described elsewhere herein.

The invention is related to driving assistance systems including multiple predictive subsystems. According to one aspect, the invention proposes to consider a combination of predictions, instead of, for example, merely using one prediction to validate the other. Employing a combination of predictions as a basis for active control enables increasing a reliability of the system operation. Two different prediction subsystems may be employed and the predictions thereof be combined with each other such that a gain for the resulting combined prediction quality is achieved in terms of, e.g., acceptance of the resulting control by the driver, range of application of the driving assistant, etc.

As an example, a specific subsystem may have highest reliability in a specific regime, such as in a specific time range, distance range, etc. An appropriate combination of the results of multiple predictive subsystems can result in an optimized reliability over the various regimes covered, wherein the combination operation may be adapted such that knowledge on the preferred regimes of the various subsystems is reflected. For example, when assigning weights to the subsystems during the combination operation, the weights may reflect a subsystem confidence or reliability which may be higher or lower than that of another subsystem either generally or for a specific regime.

For instance, with reference to the system described in EP'060, assuming a scene wherein a potential cutting-in of a moving object in front of the host vehicle is to be estimated, the prediction confidences for both the PP subsystem and the CBP subsystem raise with decreasing temporal distance to the cut-in event. However, the reliability of the CBP subsystem is higher than the reliability of the PP subsystem 2-4 seconds before the cut-in, while the reliability of the PP subsystem is higher than the reliability of the CBP subsystem 2-0 seconds before the cut-in. Improving the system according to the invention may comprise assigning a higher weight to the PP subsystem and a lower weight to the CBP subsystem, for example with respect to that kind of scenes.

These and other implementations enable initializing a response in an adaptive or tentative way. With reference to the above example, a prediction of a CBP of a lane-change of a target object may lead to the assistance system causing the tentative initialization of a braking action. If the lane-change is predicted also by the PP subsystem, the braking action may then be continued or increased in strength, while if the PP subsystem does not conform with the CBP prediction, after some time the tentative braking action may be stopped.

The invention enables a driving assistant to deal with diverging and even conflicting predictions of parallel prediction subsystems and improves over mechanisms such as merely validating one prediction with the other, or merely discarding one of the predictions and following the other. The computation of the combination of two or more predictions may for example result in another 'prediction' which may have the same representation in terms of data formats, etc. as the input predictions, but which includes values, for example probability values, which differ from any of the values of the input predictions.

The invention allows to minimize the number of error situations which may result in forced return of control to the human driver. The invention generally allows improving the response performance of driving assistants. Vice versa, with the invention the field of operation for driving assistants can be extended to cover appropriate control even in more complex and dynamic scenes than heretofore.

Controlling a strength of an automated response provides for an increased acceptance of a system's operation, as such is akin to human response to a dynamic environment wherein the intentions of the other actors (drivers) in the scene are at least to some degree unclear. A tentative action such as an anticipatory braking is what would also be performed by a human driver.

It is to be understood that the term 'strength' of a response as used herein may not only relate to a manifold or plurality of strength or intensity values to control an action, but may also be applied to actions which can be initiated only via a twofold of control signals, for example 'perform' and 'not perform'. Therefore, a specific assistance system may only signal two braking actions, namely 'braking' (with a predefined, and fixed, braking force) and 'not braking' and is intended to fall under the systems to be controllable by the invention.

A response may also include one or more actions dependent on its strength; for example a braking action with a low or intermediate strength may comprise a braking action only, while a braking action of a high strength may be defined as including a strong braking action and further the trigger of alarm signals, a fastening of seat belts, etc. (emergency braking). According to a further example, a low strength result of a prediction at a given timepoint may merely trigger the output of an indication via a Human-Machine-Interface (HMI), while a higher strength result of a subsequent prediction may then include initiation of an active vehicle control.

The invention can also be used to balance various predictive subsystems which differ in their degree of relying on error prone sensor data.

The invention is applicable for many driving assistant functions relying on predictions, such as, but not limited to, any kind of cruise control functions. The invention can be implemented at low costs, as no additional sensor equipment is required. The additional control functionality may for example be implemented in form of software modules. Existing implementations of a driver assistance system may then merely require a software update.

BRIEF DESCRIPTION OF THE DRAWINGS

In the following, the invention will further be described with reference to exemplary embodiments illustrated in the figures, in which.

DETAILED DESCRIPTION OF EMBODIMENTS

Figure 1:
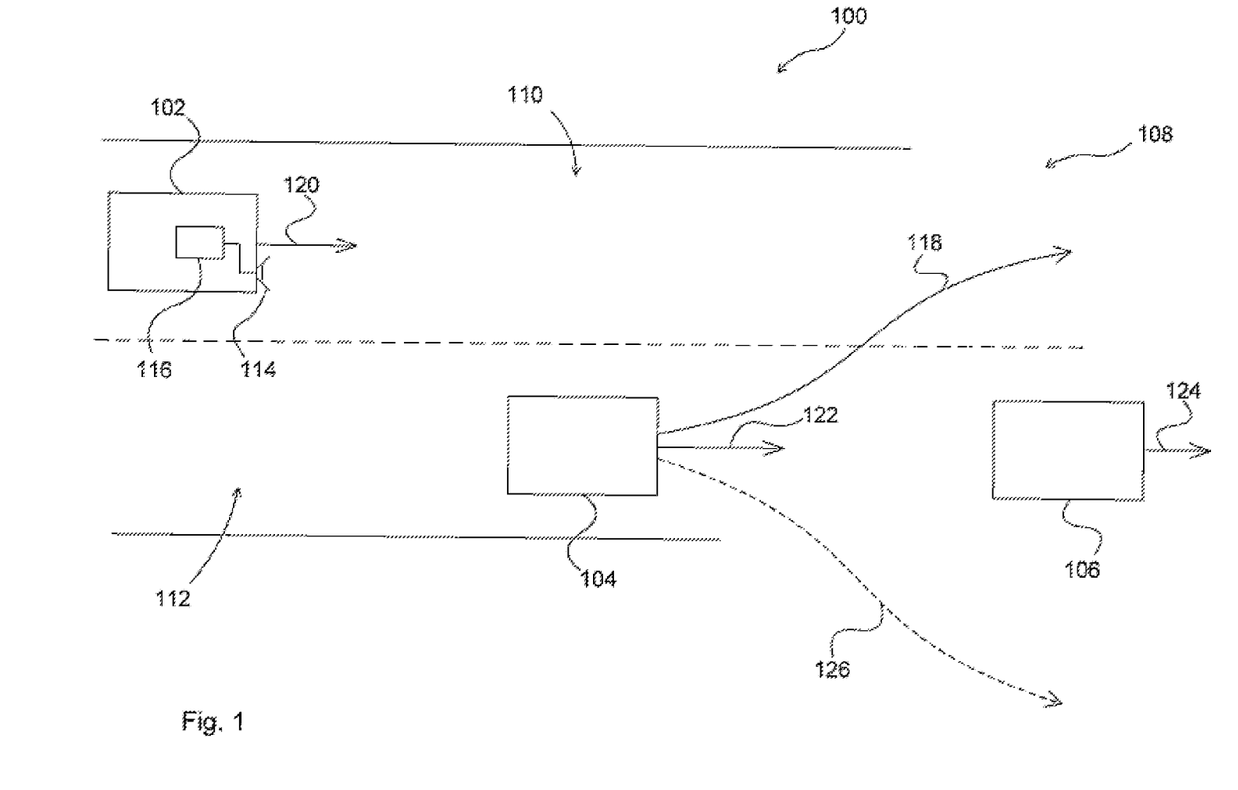
FIG. 1 schematically illustrates a host-vehicle equipped with an embodiment of the invention in an exemplary traffic situation.

FIG. 1 illustrates a traffic situation 100 with vehicles 102, 104 and 106 traveling on a road 108 with at least two lanes 110, 112. Vehicle 102, also referred to as host vehicle or ego-vehicle hereinafter, is equipped with schematically indicated sensor equipment 114 and an ECU (Electronic Control Unit) 116, wherein the latter may be realized in form of one or more hardware units onboard vehicle 102, onto which firmware and/or software is installed to implement one or more driving assistants to assist a driver of vehicle 102.

It is assumed for purposes of discussing exemplary aspects of the invention below that on ECU 116 at least one ADAS function is implemented, such as a version of an IACC or another cruise control function, the operation of which includes a prediction of the further evolution of the scene shown in FIG. 1 in the future, including a prediction of the further behavior of vehicle 104.

Figure 2:
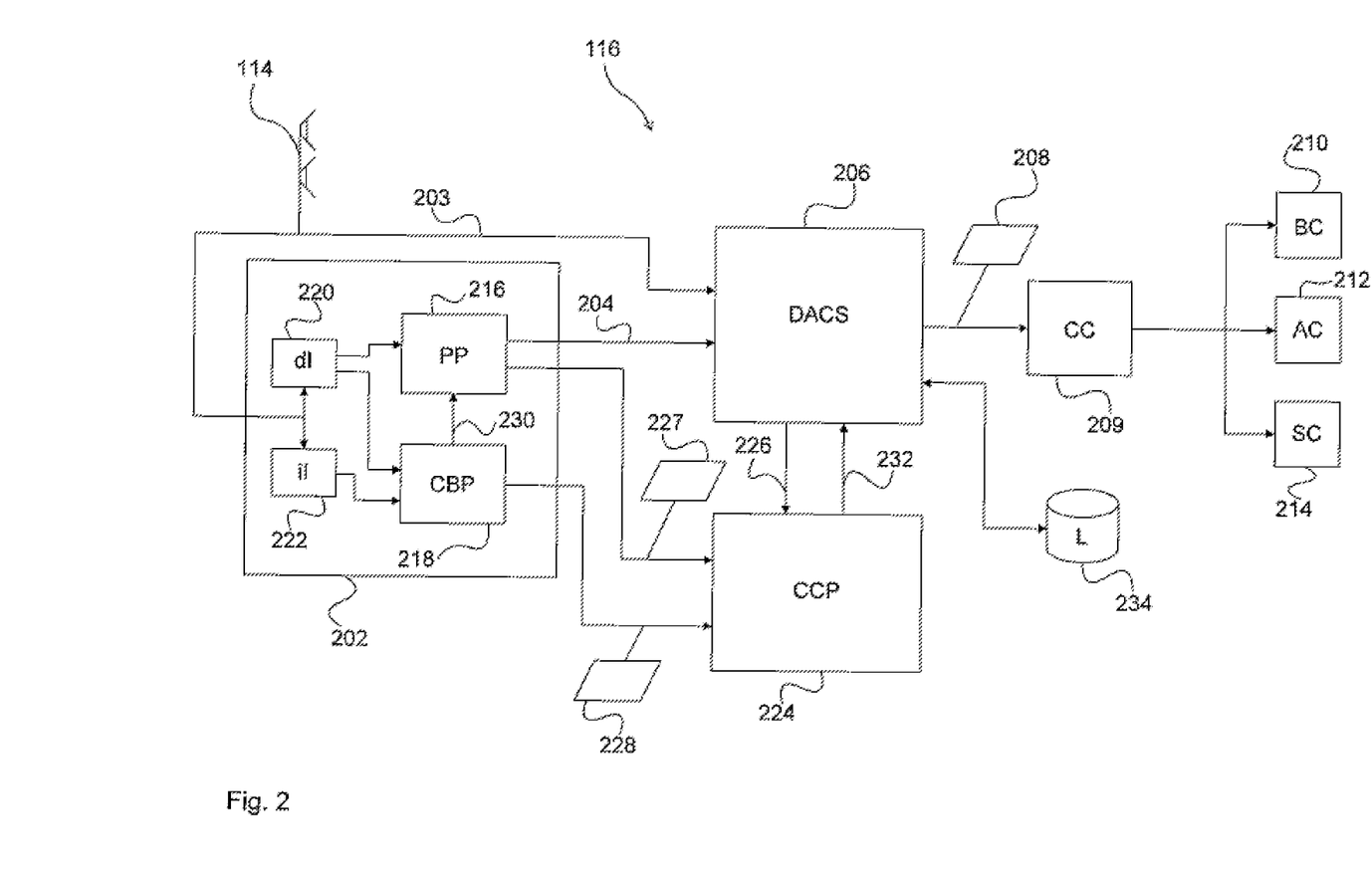
FIG. 2 illustrates functional components of an ECU of the host-vehicle of FIG. 1.

FIG. 2 illustrates functional components of the ECU 116 of FIG. 1. As a specific example, the functional components described and discussed below may be associated to a cruise control module implementing one or more IACC functionalities on ECU 116.

Data from sensor equipment 114 is received by a component 206 which operates to determine whether an active control of the host vehicle 102 is required ("DACS"=Determination of Active Control Signal). For example, component 206 may implement functions related to an ACC system. The determination is based on the current traffic situation as detected by sensor equipment 114 and represented by a signal 203, and is based on predictions of a future traffic situation, as discussed in the following. Data from sensor equipment 114 is further received by a component 202 which operates to generate predictions based on the sensor data. A signal 204 representing information related to one or both of the generated predictions is provided to the component 206

If an active control is required, component 206 operates to generate a corresponding control signal 208 which is provided to a control component 209 (CC). The component 209 accordingly controls one or more components related to control of specific functions of vehicle 102, wherein FIG. 2 exemplarily illustrates components adapted for braking control (BC) 210, acceleration control (AC) 212 and steering control (SC) 214. Other or further functions may include providing warning indications, alerts, etc.

More specifically, the sensor equipment 114 may comprise one or more radar transceivers, one or more cameras, etc. The prediction generation component 202 comprises a module or subsystem for generating Physical Predictions (PP) 216 and a module or subsystem for generating Context Based Predictions (CBP) 218. The data accepted from sensor equipment 114 is provided to an intermediate data processing layer illustrated as comprising a component 220 for providing direct data indicators (dI), and a component 222 for providing indirect data indicators (iI). The direct indicators serve as a data basis for both the PP subsystem 216 and CBP subsystem 218, while the indirect indicators serve as a data basis for the CBP subsystem 218 only.

Further details of the operation of the prediction generation component 202 including the PP 216 and CBP 218 subsystems can be as described in EP'060, see for example FIG. 6 thereof.

In case the component 206 determines that an active control of one or more functions of vehicle 102 is desired on the basis of signals 203 and/or 204, a component 224 is triggered 226, wherein component 224 operates to calculate a combination of the prediction 227 of the PP subsystem 216 and a prediction 228 of CBP subsystem 218 ("CCP"=Combination Calculation of Predictions). According to another embodiment, no trigger signal 226 is required, but signals 227 and 228 representing PP and CBP predictions, respectively, are pushed to CCP component 224 which is thereby triggered to calculate a combination thereof and provide a signal 232 representing that combination to component 206.

It is to be noted that component 224 receives signal 227 indicative of a prediction of PP subsystem 216 and signal 228 indicative of a prediction of CBP subsystem 218, while signal 204 which is accepted besides signal 203 by the component 206 for determining whether or not an active control is required may comprise only one prediction, e.g. that of the PP subsystem 216, or may comprise only a subset of data of one or both of the predictions 227 and 228. For example, the PP subsystem 216 may operate to receive 230 the CBP prediction from subsystem 218 for validation of a plurality of potential trajectories of the vehicle 104. The signal 204 may thus comprise a set of trajectories with assigned probabilities, which may have been computed by the CBP subsystem 218 for behaviors not yet detected. If a mismatch between CBP and PP is detected, only the PP prediction 204 may be output to component 206. According to another embodiment, only signals 203 and 232, but no signal 204 may be provided to component 206.

The component 224 provides 232 the result of the combination calculation to the determination component 206, which in response thereto determines the active control signal 208 based on the received combination 232 of the prediction 204 and prediction 228.

Figure 3:
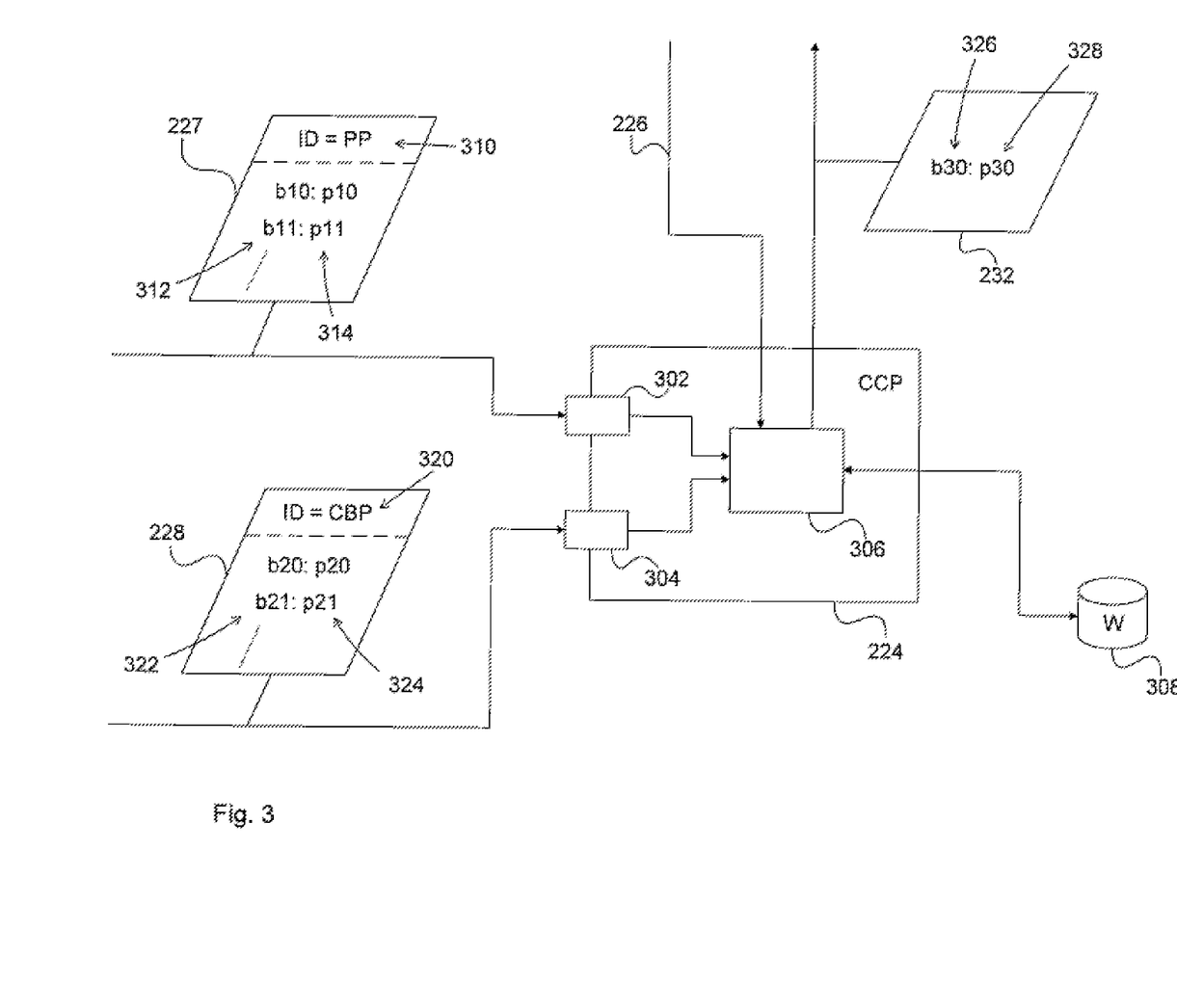
FIG. 3 illustrates details of the combination calculation module of FIG. 2 according to an embodiment of the invention.

FIG. 3 illustrates functional components of the combination calculation component 224 of FIG. 2. A component 302 is provided for accepting prediction 227 of PP component 216, and a component 304 is provided for accepting prediction 228 of CBP component 218. A component 306 calculates a combination of predictions 227 and 228 and may access an associated storage component 308 for retrieving additional data such as weights (W) assigned to the PP 216 and CBP 218 components for the purpose of the calculation.

An operation of the ECU 116 and specifically the components 206 and 224 thereof will be described in more detail with reference to the flow diagram of FIG. 4. Generally, the operation 400 of the ECU 130 is related to an active control of vehicle 102.

In step 402, a trigger for generating an active control signal is received. With respect to the specific embodiment described here, component 224 may be triggered based on trigger signal 226 from DACS component 206, and/or signals 227 and 228 received from prediction component 202.

In steps 404 and 406, which are shown separately from step 402 for reasons of clarity and may be performed in parallel, components 302 and 304 operate to accept predictions 204 and 228 from the PP 216 and CBP 218 subsystems, respectively. Prediction signals 227 and 228 may be accepted passively or actively, i.e. by a pushing or pulling technique, as is understood by the person of skill in the field, wherein for example one or both of signals 227 and 228 may act as trigger signals.

In step 408, the component 306 calculates a combination of the predictions 227 and 228. Referring to contents of signal 227, the signal representing prediction 227 comprises an identifier 310 and various behaviors 312, wherein each behavior 312 has a probability 314 assigned thereto. The identifier 310 is indicative of the PP subsystem 216, i.e. indicates that the predictions 312 are physical predictions computed based on at least direct indicators 220. Similarly, the signal representing prediction 228 comprises an identifier 320 and various behaviors 322, wherein each behavior 322 has a probability 324 assigned thereto. The identifier 320 is indicative of the CBP subsystem 218, i.e. indicates that the predictions 322 are context based predictions computed based on at least indirect indicators 222. The behaviors 312, 322 may be implemented as identifiers or may otherwise incorporate attributes to identify the particular behavior of a target object intended to be represented in the system.

For reasons of conciseness the discussion will focus below on potential future behaviors of vehicle 104 in the situation depicted in FIG. 1. Therefore it is assumed that all behaviors 312 and 322 are related to the detected or target moving object 104, while in practice predictions such as predictions 227 and 228 may comprise predicted behaviors for more or all moving objects detected by sensor equipment 114, which may for example include predictions for vehicle 106 further ahead of the ego vehicle 102.

The behaviors 312 and 322, respectively, may cover only a subset of potential behaviors of vehicle 104 and may for example cover only those behaviors of relevance for an active control of host vehicle 102. Therefore, each of the probabilities 314 and 324, respectively, may or may not sum up to a value around 1.

As a specific example, it is assumed that behavior b10 of prediction 227 relates to cutting-in of vehicle 104 to ego lane 110.

Behaviors 312 and 322 of the separate prediction subsystems 216 and 218 have to correspond to each other to a degree which allows performing meaningful combination operations. For sake of conciseness direct coincidence is assumed, i.e. behavior b10 and behavior b20 both are assumed to be directly related to the vehicle 104 cutting-in to the ego-lane 110 of vehicle 102. Other embodiments may require preparatory calculations to achieve a set of two or more independently predicted behaviors which can be combined with each other in the further operation of component 224.

Even if the behaviors b10 and b20 may both relate to the same potential behavior of vehicle 104, namely a predicted lane change indicated in FIG. 1 by trajectory 118, the associated probabilities p10 and p20 may be different, because the PP 216 and CBP 218 subsystems compute their predictions based on the physical prediction scheme and the context based prediction scheme, respectively, which are different schemes as described in detail in the EP'060.

On a high level, the PP subsystem relies on analyzing directly observable indicators such as lateral velocity, lateral position relative to lane, changing orientation relative to lane, etc. Before vehicle 104 starts to change lane, the PP subsystem therefore does not have any basis for predicting a lane change. During an early phase of the lane change, the PP subsystem predicts a lane change with low, albeit increasing probability, depending on the amount and quality of available sensor data. During an ongoing lane change, and if, for example, vehicle 104 already enters the new lane 110, the probability p10 may approach a value of 1 (i.e. 100% probability), with the probabilities p20, etc. correspondingly decreasing.

The CBP subsystem 218 relies on analyzing indirect indicators based on variables or parameters describing the scene 100 in FIG. 1, wherein the indirect indicators are intended to be observable before a predicted behavior starts. As a specific example, an indirect indicator may be related to whether vehicle 104 has a gap available on the lane 110 for a lane change, which depends on the relative positions and velocities of the vehicles 102, 104 and 106.

Another indirect indicator may relate relative velocities to each other. Referring to the exemplary situation in FIG. 1, vehicles 102, 104 and 106 may travel with velocities 120, 122, 124, respectively, which are indicated in the figure as absolute velocities relative to ground for ease of understanding but may be represented by the driving assistant 116 in a coordinate system centered on the host-vehicle 102 as relative velocities. It is assumed that vehicle 104 has a higher absolute velocity 120 than has vehicle 106 with its lower velocity 122. The fact that vehicle 104 approaches vehicle 106 may be represented by an indirect indicator, e.g. implemented as a negative relative velocity, and may be used by the CBP subsystem as one indication that vehicle 104 may perform a lane change when further approaching vehicle 106.

The probabilities assigned to behaviors b20, b21, . . . predicted by the CBP subsystem 218 may depend in detail on the analysis of a plurality of indirect indicators wherein above only few examples have been listed. For a more comprehensive list of direct and indirect indicators see EP'060.

Further behaviors b11, . . . and b21, . . . indicated schematically in FIG. 3 as part of the predictions 227 and 228, respectively, may relate to other potential behaviors of the target vehicle 104 such as keeping on lane 112 and performing a braking action to adapt its velocity 122 to velocity 124 of vehicle 106.

In the situation of FIG. 1, and if vehicle 104 has not yet actually started a lane change or if the lane change is not yet clearly detectable by the sensor equipment 114 of host vehicle 102, the CBP subsystem 218 may assign a probability value p20 to the lane change behavior b20 which is higher than the probability value p10 assigned to the lane change behavior b10 by the PP subsystem 216. For example, indirect indicators such as those discussed exemplarily above may hint towards an upcoming lane change, if the vehicle 104 has a significantly higher velocity 122 than vehicle 106, and if a gap is available on lane 110, etc., even if the lane change is not yet directly or unambiguously detectable.

In that situation, assuming a conventional driving assistance system, the signal 204 provided from the PP subsystem 216 to the determination component 206 may indicate a potential lane change of vehicle 104 with highest probability of all analyzed potential behaviors, on the basis of the context based analysis of the CBP subsystem. In case the velocity 120 of ego vehicle 102 is above that 122 of vehicle 104, the determination component may then decide to generate an active control signal to initiate a strong braking of the ego vehicle 102 in order to allow vehicle 104 the lane change and avoid a potentially dangerous situation.

Figure 5A:
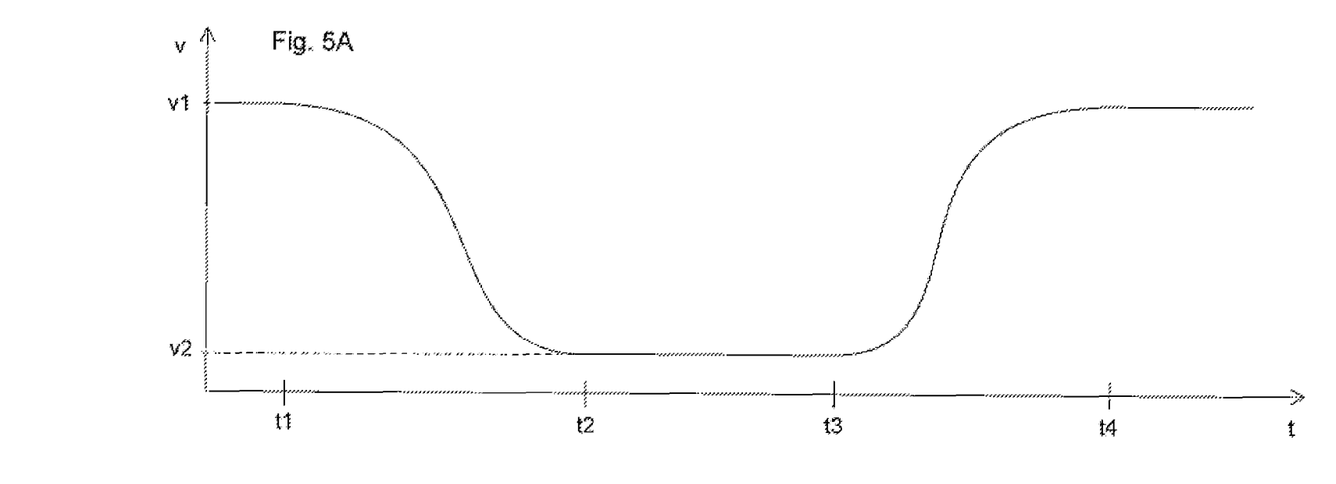
FIG. 5A is a graph illustrating a velocity over time for the host-vehicle in the situation of FIG. 1 when equipped with a conventional driving assistant.

FIG. 5A depicts a velocity v of vehicle 102 over time t in that conventional case. At a time t1 the conventional driving assistance system has analyzed a potential lane change of vehicle 104 based on a context based analysis. A strong braking is initiated to reduce the velocity 120 of vehicle 102 from a high value v1 to a lower value v2, which may be comparable to or even lower than the velocity 122 of vehicle 104, and which would keep a safety distance to vehicle 104 when it changes to ego-lane 110.

However, the vehicle 104 may show unpredicted behavior or a behavior which is predicted with a low probability only, for example with a probability lower than that assigned to the lane change behavior, or with a probability lower than a predefined threshold. As an example, FIG. 1 shows a further trajectory 126. It is assumed here for the purpose of discussion that vehicle 104 in fact follows trajectory 126 rather than trajectory 118. As an example, vehicle 104 may take an exit of road 108, and the exit has either not or not yet been detected by sensor equipment 114 due to a general limitation of the sensor equipment regarding analysis of non-moving objects and/or due to data fuzziness, or the behavior related to the trajectory 126 has been assigned a low probability only in the context based analysis, for example due to a high absolute velocity 122 of vehicle 104.

Taking on with the conventional example depicted in FIG. 5A, as soon as the vehicle 104 detectably follows trajectory 126 instead of 118, the physical prediction will operate to assign a higher probability to the corresponding behavior, and either the PP subsystem 216 or the determination component 206 will decide that vehicle 104 will be irrelevant for the further travel of the ego vehicle 102. As a result, in the situation of FIG. 1, the vehicle 102 will accelerate from a time t3 onwards as depicted in FIG. 5A, and may accelerate strongly to keep safe distance to objects behind vehicle 102 until at a time t4 a velocity such as v1 is again reached.

The driver of vehicle 102 may not feel comfortable during potentially strong braking in time interval t1-t2 and/or during potentially strong acceleration during time interval t3-t4. Moreover, the cruise control as depicted in FIG. 5A may not be accepted also because the driver does not see a motivation for the potentially strong braking between times t1 and t2, and the re-acceleration back to velocity v1 during time interval t3-t4 may be experienced as an apparent correction of a superfluous error made by the driving assistant.

Figure 4:
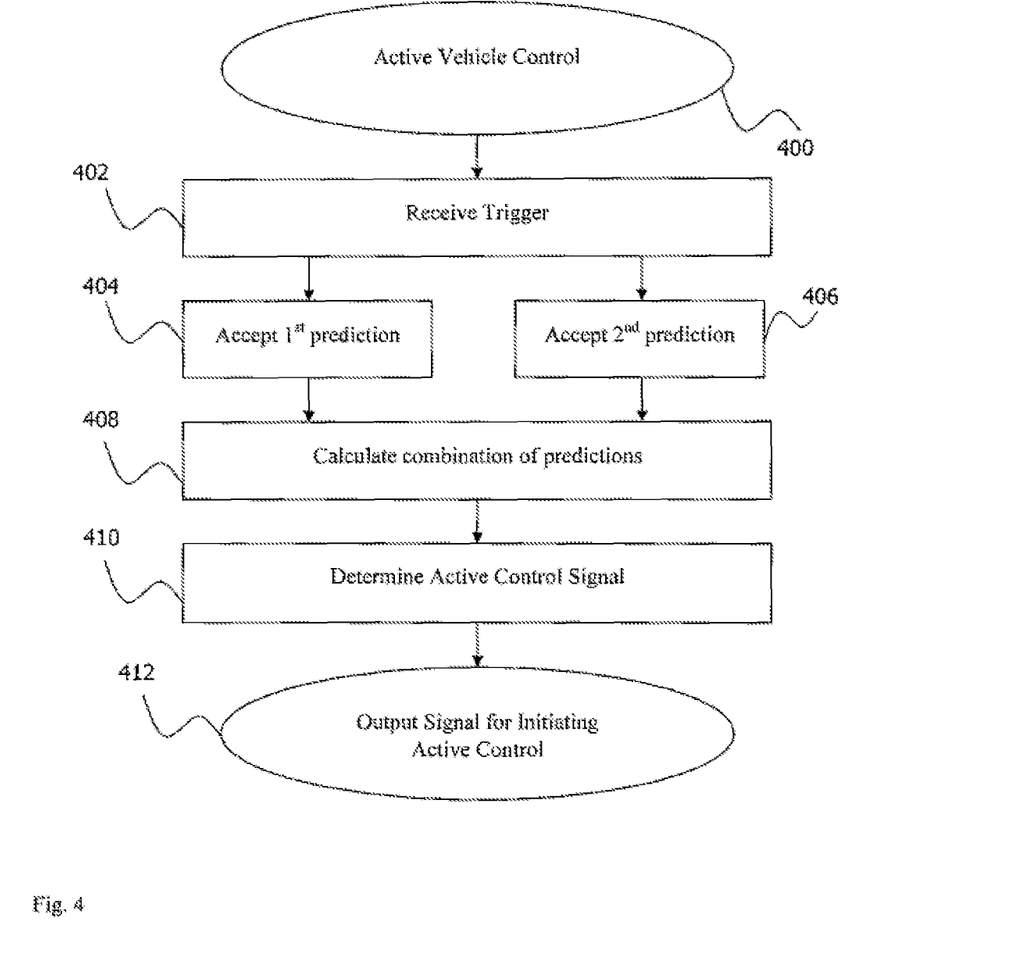
FIG. 4 is a flow diagram illustrating an operation of the ECU of FIG. 2.

Turning back to the operation of the driving assistant implementing an embodiment of the invention, instead of deciding on whether or not an active control is to be performed on the basis of signal 204 only, the determination component 206 triggers combination calculation component 224 for further analysis (step 402 in FIG. 4). Referring to the example discussed further above, the calculation component 306 may calculate a combination of the probabilities p10 and p20 assigned to the lane change behaviors b10 and b20, even if signal 204 may indicate only the probability p20 to the determination component 206. The combination operation may comprise a summation or a product of the probabilities for behavior b10/b20, wherein the result may or may not be appropriately re-scaled for the sum of all combined probabilities resulting in a value around 1 (that sum may never be actually calculated and is understood as merely being presented here for reasons of discussion).

One or more of the probabilities included in the combination operation may be assigned weights which may, for example, express a subsystem confidence or reliability of the predictions of the subsystems 216 and 218. The weights itself, or a basis for calculating such weights, may be predefined and held in storage 308. The weights may reflect a relative confidence or reliability of the various subsystems relative to each other.

The weights may comprise a single value per subsystem, or may comprise a plurality of values per subsystem. For example, specific relative weights reflecting specific relative confidences or reliabilities may be stored for each specific behavior or groups of behaviors. Referring to a simple example only for the further discussion, the CBP subsystem 218 may have assigned one weight value only, i.e. a single, constant weight value, which is lower than one weight value only which is assigned to the PP subsystem 216. The single weight value, which may be applicable for all or a subset of combination operations performed by component 306, may reflect a generally lower confidence or reliability of context based predictions in comparison to physical predictions, wherein context based predictions are based on indirect indicators and may be seen as assumptions being founded to some degree, while physical predictions are based on direct indicators, i.e. direct observations, and may therefore be seen more reliable (depending on assumptions regarding data inaccuracies).

The calculation component 306 provides signal 232 to the determination component 206, wherein the signal 232 indicates a result of the combination calculation, for example, the result may be stored elsewhere and signal 232 represents a pointer to the results. As exemplarily depicted in FIG. 3, signal 232 may also directly represent the calculation result, for example in a prediction format similar to that of signals 227 and 228, including one or more behaviors 326 and associated probabilities 328. For the example discussed here, signal 232 may at least include a behavior b30 related to a potential change of vehicle 104 to ego lane 110, and an associated probability p30, which may represent the result of a combination operation involving the probabilities 314 and 324. A number value of p30 may differ from both the number values of p10 and p20.

Determination component 206 receives, in response to trigger 226, the signal 232 reflecting a combination of the predictions 227 and 228 of the PP 216 and CBP 218 subsystems with regard to a potential lane change of vehicle 104. Referring to step 410 of the operational flow in FIG. 4, the determination component 206 determines a control signal based on the received calculated combination 232.

As described above, the determination of the control signal 208 in component 206 may be based on probability p30 which is computed from the two probabilities p11 and p21. Although the probabilities p11 and p21 have already been used for computing probability p30, one or both of the individual probabilities p11 and p21 may also be used as a direct input to the determination of control signal 208. The input may also include further portions of the individual predictive data, such as the corresponding identifiers 310 and 320, respectively. As a specific example, in this way an active control may be implemented wherein a braking force applied as a result from a prediction of the CBP subsystem 218 is generally lower than a braking force applied as a result from a prediction from the PP subsystem 216.

Various computations may be performed on the basis of signal 232 and to generate the active control signal 208. Depending on the details of the implementation, for example various computations as known from conventional driving assistant systems, e.g. cruise control systems, can be re-used for implementing a driving assistant according to the invention. For example, the component 206 may decide on generating a control signal based on a maximum probability assigned to a relevant behavior, or a probability being at least above a threshold.

As a result of having high-level processing data such as signal 232 available, which represent a combination of the predictions of the separate subsystems 216 and 218, it is feasible to generate control signals which indicate a finer adjustment of an action to be initiated than in conventional systems. This will be discussed within an exemplary framework of initiating active control depicted in FIGS. 6A and 6B, wherein a signal such as signal 208 in FIG. 2 may select one of a plurality of levels available.

Figure 6A:
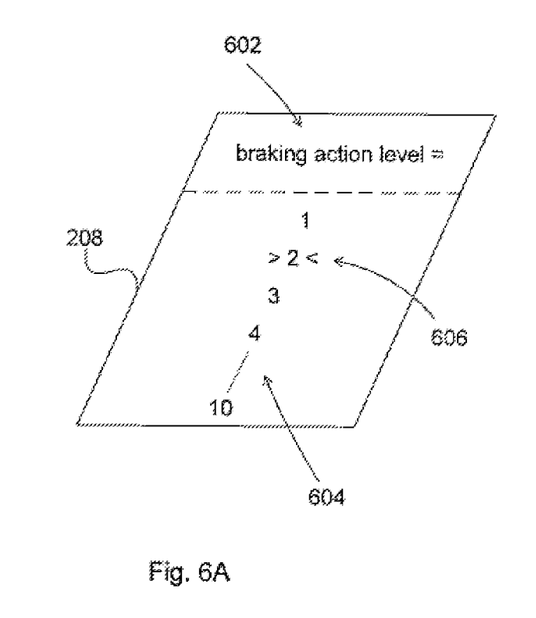
FIG. 6A illustrates a control signal indicating a braking level according to an embodiment of the invention.

FIG. 6A illustrates an example for an active control signal 208 which may be provided by the determination component 206 on the basis of the signal 232 being received from the combination calculation component 224 and the current perception of sensor equipment 114 as represented by signal 203. As may be indicated by a header section 602, the action to be actively controlled in this example is a braking action. A strength of a braking action may generally be measured to lie within a range 604 of allowed braking levels wherein level 0 may indicate no braking, level 10 may indicate maximum braking, i.e. full braking or emergency braking, and intermediate levels such as levels 2, 5 and 8 may be understood as defining or referring to mild, medium and strong braking actions, respectively.

The control signal 208 may indicate one of the allowed braking levels. As indicated by symbols 606 in FIG. 6A, for example a mild braking action may be indicated in response to a combined probability represented by signal 232.

It is to be understood that indication 606 may be adjusted further, e.g. in the downstream control component 209, before being provided to the braking control 210. For example, the braking force actually to be applied according to adaptive cruise control may be adjusted based on further parameters such as a distance and (relative) velocity of a target vehicle. According to a specific example, a braking force actually applied may be less for a distant vehicle than a braking force actually applied for a closer vehicle, even for one and the same value 606 as indicated in control signal 208.

Figure 6B:
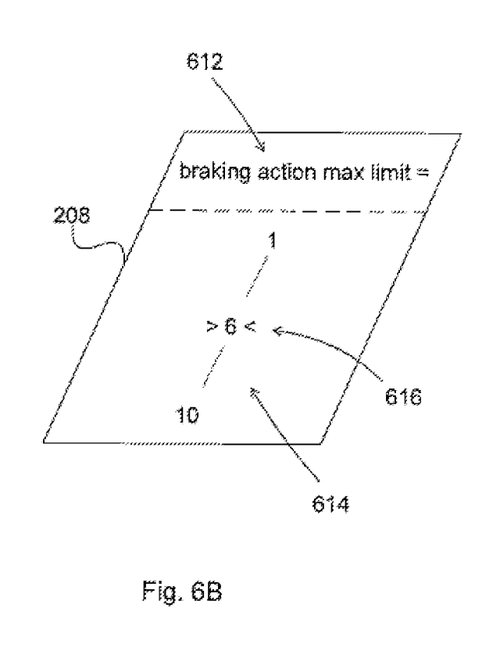
FIG. 6B illustrates a control signal indicating a braking level maximum limit according to an embodiment of the invention.

FIG. 6B illustrates another example for an active control signal 208. A header section 612 may again be reserved for indicating the action to be actively controlled by the system. Instead of directly indicating a level related to a strength of, for example, a braking force to be applied, a limit 614, i.e. a maximum allowable level of a braking force is defined as illustrated by symbols 616.

In this respect it is noted that generally a response of a driving assistant can be limited to within a predefined range, for example for improved user acceptance of such systems, to comply with statutory regulations, etc. Values for allowable limits defining value ranges available for active control can be predefined and are illustrated in FIG. 2 as being stored in a storage component 234 ("L"=Limits) and are in this way accessible by the determination component 206. It is illustrated in FIG. 6B how the concept of providing a limited range of action levels may further be employed according to an aspect of the invention in order to provide an active control which is adaptive to specific traffic situations.

The operation as illustrated in FIG. 4 may end in step 412 with providing the determined active control signal for initiating an active control correspondingly. For example, the indication of a maximum (or minimum) limit or allowable level of a braking force according to FIG. 6B may be provided to control component 209 in FIG. 2, which is intended to represent any kind of processing which may be required for or applicable to the active control signals 208 in a driving assistant adapted for active vehicle control.

As but one example, functionality of control component 209 may include a comfort function which modifies and delays the maximum braking action 616 in a way that control signals in fact applied to braking control 210 indicate a soft onset of braking starting with low braking levels and the maximum braking action 616 is applied only after a predefined time delay for comfort of the passengers of vehicle 102. Parameters such as the time delay may also be applied dependent on the allowable maximum limit, e.g., in case of an emergency braking, the time delay before onset of maximum braking may be set to zero.

As a further example, control component 209 may operate to evaluate the scene around the ego vehicle further in order to adapt active control indicated by control signal 208 accordingly. One intention would be to avoid confusion of other traffic participants, minimize disturbance of traffic flow, etc. Therefore, before initiating an action such as an acceleration, deceleration, lane change, etc. of the ego vehicle, any such action may be filtered accordingly. The entire environment of the ego vehicle might have to be evaluated in this respect, including a rearward area. The component 209 may adapt a strength/limit and/or timelines for an active control accordingly.

As a further example for its operation, control component 209 may operate to initiate a forwarding of information related to the intended and/or ongoing automated active control to other systems of the ego-vehicle and/or other vehicles.

Figure 7A:
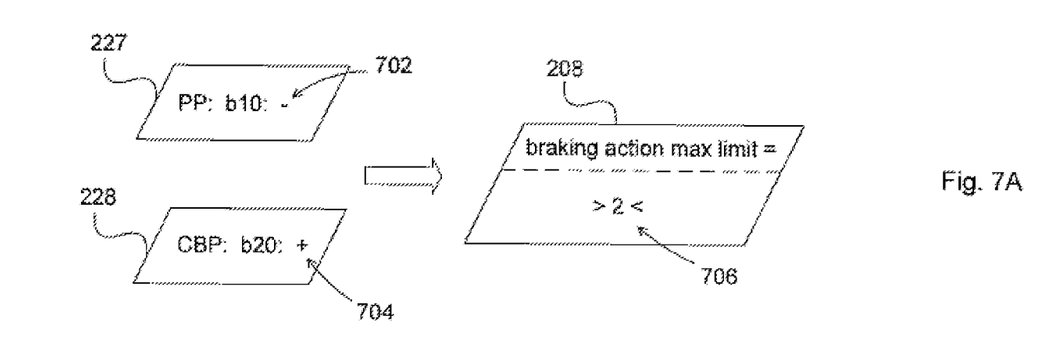
FIG. 7A illustrates a control signal resulting from a combination of two independent predictions according to a first specific constellation.
Figure 7B:
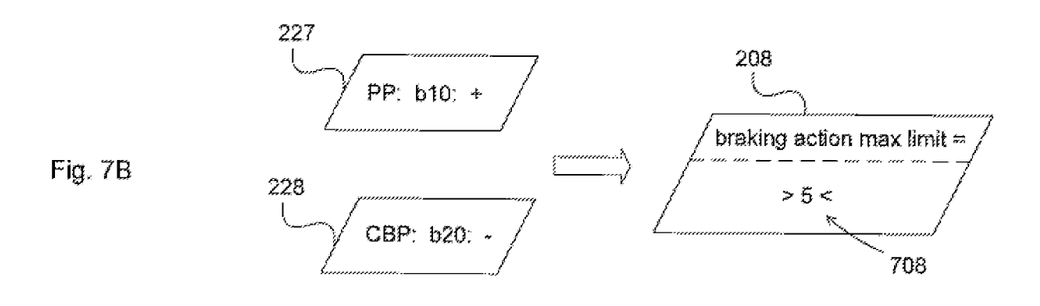
FIG. 7B illustrates a control signal resulting from a combination of two independent predictions according to a second specific constellation.
Figure 7C:
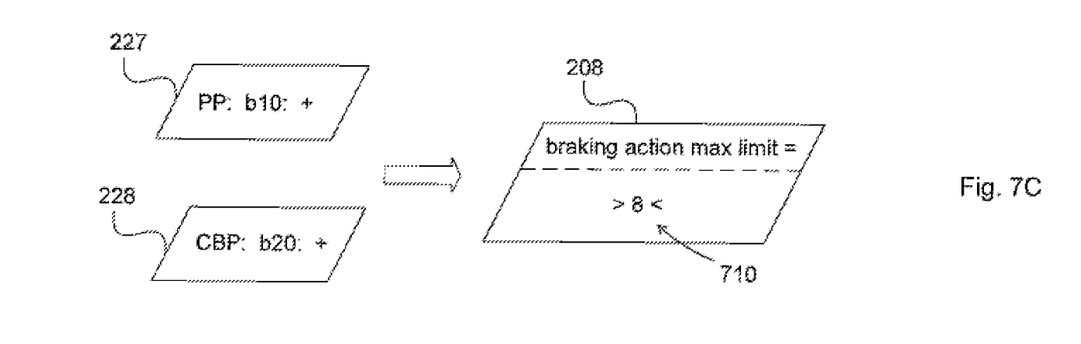
FIG. 7C illustrates a control signal resulting from a combination of two independent predictions according to a third specific constellation.

FIGS. 7A-7C schematically illustrate various control signals 208 for active control of a vehicle as they may result from specific combinations of predictions 227, 228. If not explicitly discussed in the following, details and specifics of signals 208, 227, 228 are to be understood as has been discussed before with regard to these reference numerals. Specifically, each of FIGS. 7A-7C presents a prediction 227 of the PP subsystem 216, a prediction 228 of the CBP subsystem 218 in FIG. 2, and an active control signal 208 as it may be provided by the determination component 206 towards the further control component 209.

Purely for sake of discussion the probabilities assigned to the predictions 227 and 228 can take on only the binary values '+' and '−', indicating that the related behavior 'is predicted' and 'is not predicted', respectively.

FIG. 7A illustrates a situation wherein the PP subsystem 216 provides a prediction 227 according to which the behavior b10 related to a cutting-in of vehicle 104 to the ego-lane of the host-vehicle 102 is not predicted ('−'), while the CBP subsystem 218 provides a prediction b20, according to which a cutting-in of vehicle 104 to the lane of vehicle 102 is predicted ('+'). Such predictions may for example occur in unclear situations such as that illustrated in FIG. 1, wherein vehicle 104 can be expected to perform a lane change, but has not yet detectably started to do so.

The active control signal 208 resulting from a combination calculation of both predictions in FIG. 7A may be a 'mild braking' as indicated by a low strength 706 of the maximum limit of allowable braking force. One reason for the control signal 208 "mild braking allowed" may be that due to a subsystem confidence weight assigned with a lower value to the CBP subsystem than to the PP subsystem, a behavior which is predicted only by the CBP subsystem is assessed as being anticipated with low confidence and therefore a mild braking is allowed only, which may be implemented and felt by the driver as a tentative or preparatory braking action.

FIG. 7B illustrates a situation wherein the PP subsystem 216 provides a prediction 227 according to which the behavior b10 related to a cutting-in of vehicle 104 to the ego-lane of the host-vehicle 102 is predicted ('+'), while the CBP subsystem 218 provides a prediction b20, according to which a cutting-in of vehicle 104 to the lane of vehicle 102 is not predicted ('−'). Such predictions may for example occur in situations wherein a detected object performs an unexpected behavior such as a sudden lane change, braking or acceleration action without being motivated to do so by the detected traffic scene.

The active control signal 208 resulting from a combination calculation of both predictions in FIG. 7B may be a 'medium braking' as indicated by strength 708 of the maximum limit of allowable braking force. One reason for the control signal 208 "medium braking allowed" may be that due to a subsystem confidence weight assigned with a higher value to the PP subsystem than to the CBP subsystem, a behavior which is predicted only by the PP subsystem is assessed as being anticipated with medium confidence and therefore a medium braking is allowed. For example, as the PP subsystem is based on direct indicators, i.e. directly observable parameters such as movements of the target vehicle, predictions of the PP subsystem are generally more reliable than that of the CBP subsystem (i.e. the PP subsystem has a higher subsystem confidence than the CBP subsystem), but in particular in the early phases of a predicted behavior, the predictions can be error-prone, e.g., due to sensor data fuzziness or sensor data errors.

FIG. 7C illustrates a situation wherein the PP subsystem 216 provides a prediction 227 according to which the behavior b10 related to a cutting-in of vehicle 104 to the ego-lane of the host-vehicle 102 is predicted ('+'), and the CBP subsystem 218 provides a prediction b20, according to which a cutting-in of vehicle 104 to the lane of vehicle 102 is also predicted ('+'). Such predictions may for example occur in situations wherein a detected object performs in fact a behavior as predicted earlier by the CBP subsystem; for example, a lane change has been predicted for a target vehicle for some seconds, and eventually the target vehicle starts to in fact perform the lane change, which is the earliest time point at which also the PP subsystem will provide a corresponding prediction with high probability.

The active control signal 208 resulting from a combination calculation of both predictions in FIG. 7C may be a 'strong braking' as indicated by strength 710 of the maximum limit of allowable braking force. The control signal 208 "strong braking allowed" may result from both prediction subsystems predicting a behavior, i.e. the prediction is assessed as being anticipated with high confidence.

The probability values which may be assigned to predicted behaviors by each of the prediction subsystems have been simplified in FIGS. 7A-7C. Generally, probability values need not be binary values such as '+' or '−'. but can be represented as real numbers or as values taken from any range as desired according to the specifics of an implementation. Any calculation can be performed based on the probability values assigned to the predictions of the separate subsystems, for example in order to arrive at a combined probability 328 as illustrated in FIG. 3.

Therefore, the indication of a particular level or strength of an action to be performed, as exemplarily indicated in FIG. 6A, or of a maximum and/or minimum level, as exemplarily indicated in FIGS. 6B and 7A-7C, may be determined in component 206 according to the probability value or values 328 of the combined prediction of behavior 326. For example, a high probability value 328 for a behavior 326 may be transferred into a high level or strength value, or a high maximum level, of a braking action, acceleration action, etc. to be performed. Additionally or alternatively, the determination of the level or limit of the action to be automatically applied may be determined based on one or more of the predictions 227 and 228, e.g. based on the probability values 314 and 324, which would require both the predictions 227 and 228 to be available at the determination component 206.

While for exemplary reasons only systems with two predictive subsystems are discussed here, it is to be noted that other embodiments of driving assistance systems may comprise three or more separate prediction subsystems or modules. Accordingly, a combination calculation then has to combine three or more predictions. As an example, for a system comprising three prediction subsystems, a combination rule may represent a prescription such as "Brake hard if module1 is active AND module2 is active AND modul3 is INACTIVE." As another example, for a system comprising at least four prediction subsystems, a combination rule may represent a prescription such as "Brake only hard if at least 4 modules are active". Instead of indicators such as "active" or "inactive", or as the strength indicators "+" and "−" of FIGS. 7A-7C, any other indicators could additionally or alternatively be used.

Figure 5B:
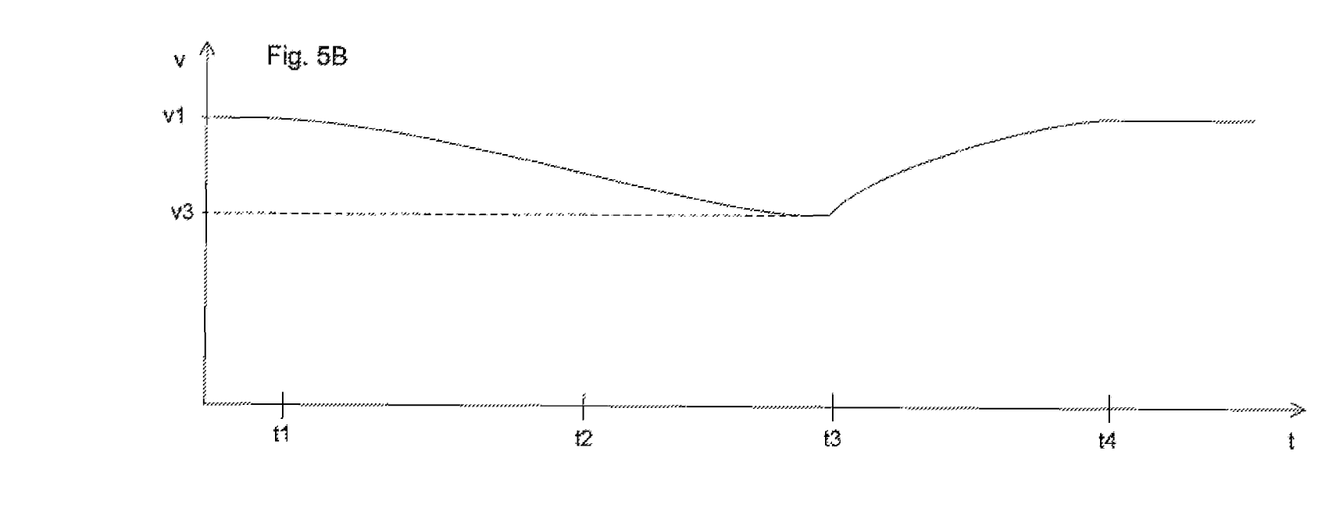
FIG. 5B is a graph illustrating a velocity over time for the host-vehicle in the situation of FIG. 1 when equipped with a driving assistant according to an embodiment of the invention.

FIG. 5B illustrates an active control as resulting from the operation of an embodiment of an inventive driving assistance system. The scheme of illustration in FIG. 5B is similar to that of FIG. 5A in order to clearly illustrate the discrepancies between the operations.

With reference to FIG. 5B, at time t1 a context based analysis of the CBP subsystem 218 of the inventive driving assistant starts to predict a lane change of vehicle 104 based on indirect indicators derived from a detection of the scene 100 as depicted in FIG. 1. However, at time t1 vehicle 104 has not yet started any lane change, which is why the PP subsystem 216 has no reason to predict a lane change of vehicle 104. Calculating a combination of the predictions of both subsystems result in an active control signal "mild braking allowed" similar to the signal 208 as depicted in FIG. 7A. A human driver might behave similar in that situation and would perform a tentative mild braking presuming a potential upcoming lane change of vehicle 104.

At time t2 in FIG. 5B, vehicle 104 is assumed to detectably start a lateral movement away from the host vehicle 102, i.e. at t2 it is physically detectable that vehicle 104 will in fact follow the trajectory 126 in FIG. 1 instead of trajectory 118. Therefore, the PP subsystem 216 will start to predict at t2 with increasing probability (depending, e.g., on sensor data error ranges) that vehicle 104 will follow trajectory 126 instead of trajectory 118. Additionally, the CBP subsystem 218 may predict the trajectory 118 with decreasing probability.

Calculating a combination of the predictions of the two subsystems will then soon result in that the mild braking action will be decreased and stopped. For example, as the PP subsystem has been assigned a higher subsystem confidence value as the CBP subsystem, the predictions of the PP subsystem will be rated or ranked higher than the predictions of the CBP subsystem, such that the prediction of the PP subsystem will soon overtake that of the CBP subsystem.

As vehicle 104 continues to follow trajectory 126, the corresponding prediction of the PP subsystem will gain higher and higher probability values, until at around time t3 braking of host vehicle 102 is stopped. From t3 on the velocity of host vehicle 102 may increase based on an acceleration action performed by the driving assistant, which can be the result of the driving assistant assessing potential further behaviors of vehicle 104 as irrelevant for the ego vehicle 102, for example because vehicle 104 has already left lane 112 to the right. Predictions with highest probabilities of both the PP and the CBP subsystems may therefore agree in that there will be no cutting-in to ego lane 110 (which may be based on agreeing predictions related to vehicle 106), and therefore vehicle 102 may be actively controlled to accelerate back to cruising speed v1.

As to be inferred from a comparison of FIGS. 5A and 5B, the embodiment of the inventive driving assistant enables that the braking and accelerating actions of vehicle 102 in the situation depicted in FIG. 1 are less and the minimum velocity v3 reached during braking action is less different from cruising velocity v1 as in the conventional case with minimum velocity v2. The overall control initiated by the inventive driving assistant according to FIG. 5B is more akin to a control as would be performed by a human driver. Such active control therefore is particularly acceptable to a human driver in the ego-vehicle as well as to traffic participants in the vicinity.

While embodiments of the invention have been discussed with reference to the exemplary traffic scene 100 of FIG. 1, it is worth to be noted that the invention is likewise applicable also for a driving assistant which may not only be related to detecting moving objects in front of the host vehicle and predicting a behavior thereof, but which may also be related to detecting and predicting moving objects in an area rearward of the ego vehicle; as an example, an automatic cruise control may execute lane change maneuvers to give way to faster vehicles approaching from behind.

Likewise, the invention may be implemented with any kind of driving assistant related to predictions which includes not only cruise control, but many more functions such as even parking assistants, and which includes assistant functionalities to be developed in the future.

While the invention has been described in relation to its preferred embodiments, it is to be understood that this description is intended non-limiting and for illustrative purposes only. In particular, various combinations of features wherein the features have been described separately hereinbefore are apparent as advantageous or appropriate to the skilled artisan. Accordingly, it is intended that the invention be limited only by the scope of the claims appended hereto.

The invention claimed is:

1. A method for actively controlling a vehicle, the method comprising the following steps:
accepting a first prediction of a behavior associated with a detected object from a first prediction subsystem of a driver assistance system of the vehicle to obtain a first prediction result;
accepting a second prediction of said behavior from a second prediction subsystem of the driver assistance system in order to obtain a second prediction result of the same behavior associated with said detected object;

combining the first prediction result and the second prediction result and assigning, during the combination, a weight to the first prediction subsystem and a weight to the second prediction subsystem, wherein the weights reflect a relative confidence or reliability of the first prediction subsystem and the second prediction subsystem relative to each other;

determining a control signal for controlling the vehicle in response to the predicted behavior, wherein a strength of the control signal is controlled by the combination; and initiating, with respect to the predicted behavior, active control of the vehicle based on the control signal.

2. The method according to claim 1,
wherein the control signal indicates one value taken from a range of values associated with a particular operation of the vehicle.

3. The method according to claim 2,
wherein the control signal sets a maximum or minimum value of the range of values.

4. The method according to claim 1,
wherein in each of the first and second predictions, a probability value is assigned to the behavior, and the combination of the results of the first and second predictions comprises a combination of said probability values.

5. The method according to claim 1,
wherein the control signal indicates at least one of an acceleration or deceleration of the vehicle, and a steering angle of the vehicle.

6. The method according to claim 1,
wherein the first prediction subsystem is a context based prediction subsystem for predicting behavior based on indirect indicators observable before a start of a predicted behavior, and the second prediction subsystem is a physical prediction subsystem for predicting behavior based on direct indicators observable after a start of a predicted behavior.

7. The method according to claim 6,
wherein the context based prediction subsystem has associated therewith a lower weight than the physical prediction subsystem.

8. A non-transitory computer program product comprising program code portions for performing the method according to claim 1 when the computer program product is executed on a computing device.

9. A driver assistance system for actively controlling a vehicle, comprising:
a component adapted to accept a first prediction of a behavior associated with a detected object from a first prediction subsystem to obtain a first prediction result;
a component adapted to accept a second prediction of said behavior from a second prediction subsystem in order to obtain a second prediction result of the same behavior associated with said detected object;
a component adapted to combine the first prediction result and the second prediction result and to assign, during the combination, a weight to the first prediction subsystem and a weight to the second prediction subsystem, wherein the weights reflect a relative confidence or reliability of the first prediction subsystem and the second prediction subsystem relative to each other;
a component adapted to determine a control signal for controlling the vehicle in response to the predicted behavior, wherein a strength of the control signal is controlled by the combination; and
a component adapted to initiate, with respect to the predicted behavior, active control of the vehicle based on the control signal.

10. The system according to claim 9,
wherein the driver assistance system comprises a cruise control module adapted to perform an active control of the vehicle in response to a lane-change of a detected object cutting-in to or cutting-out from a lane of the vehicle.

11. A vehicle comprising a system according to claim 9.

* * * * *